United States Patent [19]

Patmont

[11] Patent Number: 4,821,832
[45] Date of Patent: Apr. 18, 1989

[54] MOTOR SCOOTER HAVING A FOLDABLE HANDLE AND FRICTION DRIVE

[76] Inventor: Steven J. Patmont, P.O. Box 0097, Pleasanton, Calif. 94566

[21] Appl. No.: 71,354

[22] Filed: Jul. 9, 1987

[51] Int. Cl.⁴ .................. B62K 11/10; B62K 15/00; B62M 13/00
[52] U.S. Cl. ................... 180/208; 464/160; 192/58 B; 180/219; 180/221; 280/47.315; 280/87.041
[58] Field of Search ............... 280/87.04 R, 87.04 A, 280/47.37 R, 655, 12 H, 23; 180/180, 181, 208, 219, 220, 233, 221, 222, 74; 192/58 B; 464/160, 24, 30; 60/343; 188/290, 268

[56] References Cited

U.S. PATENT DOCUMENTS

| | | | |
|---|---|---|---|
| D. 148,716 | 2/1948 | Mertz | 180/219 |
| 1,395,497 | 11/1921 | Huseman | 280/87.04 R |
| 1,516,105 | 11/1924 | Kinoshita | 280/87.04 R |
| 1,832,018 | 11/1931 | Gossard | 180/220 |
| 1,968,975 | 8/1934 | Upsacker et al. | 280/87.04 R |
| 2,253,001 | 8/1941 | Webb et al. | 192/58 B |
| 2,486,689 | 11/1949 | Tibores et al. | 280/87.04 R |
| 2,792,095 | 5/1957 | Sherman | 192/58 B |
| 2,861,814 | 11/1958 | Rebhun | 280/87.04 R |
| 2,984,499 | 5/1961 | Humphrey | 280/47.37 R |
| 3,606,371 | 9/1971 | Rousseau et al. | 280/47.37 R |
| 3,998,476 | 12/1976 | Kazmark, Sr. | 280/655 |
| 4,113,043 | 9/1978 | Palmer | 180/221 |
| 4,503,952 | 3/1985 | Hesse | 192/58 B |
| 4,611,684 | 9/1986 | Geschwender | 280/87.04 A |

FOREIGN PATENT DOCUMENTS 0025960 4/1981 European Pat. Off. ............ 180/221

Primary Examiner—Charles A. Marmor
Assistant Examiner—Karin Tyson
Attorney, Agent, or Firm—Head & Johnson

[57] ABSTRACT

An improved light-weight, highly portable motor scooter having an elongated tubular frame which serves as muffler for a gasoline engine, a rear wheel secured to the frame at the rearward end thereof, a generally vertical, tubular support member secured to the frame at the forward end, a generally vertical strut member rotatably received within the tubular support member and having a yoke on the lower end thereof below the tubular support member, the yoke receiving a front wheel, a horizontal platform mounted on the frame, an engine secured to the frame adjacent the rearward end having a converter for coupling the engine to the rear wheel, an elongated handle member pivotally affixed at its lower end to the upper end of the strut member, the handle member being pivoted in a forward direction to pull the scooter and in a rearward direction to lie adjacent and parallel the frame whereby the scooter can be carried and extendable in an axially aligned position relative to the strut member permitting the user to guide the motor scooter while in motion, and a tubular sleeve received on the handle member and extendable over the upper end of the strut member to releasably lock the handle member and the strut member in the aligned position.

4 Claims, 3 Drawing Sheets

MOTOR SCOOTER HAVING A FOLDABLE HANDLE AND FRICTION DRIVE

BACKGROUND OF THE INVENTION

Motor scooters have long been used as an inexpensive means of transporation. The typical motor scooter includes a front and rear wheel, an engine supplying power to the rear wheel, a means of stearing the front wheel and a platform for the user to stand on. In larger size scooters a seat is also employed. Scooters of this type are exceedingly useful and popular, however, they have certain limitations which this invention overcomes. One problem with known type of scooters is that they are universally too bulky and heavy to be easily transported. For instance, the typical scooter is too heavy for a user to lift into and out of a vehicle, such as a car, pick-up, trailer or motor home. Presently used scooters are too heavy and bulky to be carried on and off an airplane by a user and are too heavy and bulky to be used as a personal conveyance by travelers.

An object of the present invention is to provide an extremely light-weight, compact, quiet, and easy to use scooter which can be easily carried by an individual or which can be pulled along by an individual with convenience and which can be easily loaded into a vehicle or airplane.

To achieve the light-weight, compact, quiet, and easily transportable characteristics of the present invention a unique combination of structural features is employed. The improved motor scooter of this invention has an elongated generally horizontal frame member having a forward end and a rearward end. A rear drive wheel is secured to the frame member rearward end and mounted for rotation about an axis which is normal to the vertical plane of the frame member.

A generally vertical tubular support member is secured to the frame forward end in a vertical plane of the frame member. Received within the vertical tubular support member is a strut member which rotates relative to the tubular support member. The lower end of the strut member is in the form of a yoke and rotatably receives a front wheel. The upper end of the strut member extends above the yoke member.

A horizontal platform is secured to the frame member between the front and rear wheels permitting the user to stand on the platform while the motor scooter is in motion.

An engine, such as a light-weight gasoline engine, either 2 cycle or 4 cycle, with 2 cycle being preferred because of its light-weight and compactness. The engine has a drive shaft extending therefrom and means is provided to couple the engine drive shaft to the rear wheel.

An elongated handle member has the lower end thereof pivotally secured to the upper end of the strut member so that it pivots in a vertical plane relative to the strut member. The handle member has a horizontal handle bar affixed to the upper end thereof.

The handle member can be locked in axial alignment to the strut member, thereby permitting the user to guide the motor scooter by rotation of the handle member which in turn rotates the strut member and thereby the front wheel. The handle member can also be unlocked relative to the strut member and pivoted forwardly allowing the user to pull the motor scooter behind him. In another position the handle member may be pivoted rearwardly to lie over substantially parallel the tubular frame member and when locked in such position allows the user to easily carry the motor scooter by grasping the horizontally extending handle.

For locking the handle member to the strut member in axial alignment, a tubular sleeve is slideably received on the handle member. When the handle and the strut member are in axial alignment, the tubular sleeve is slid downwardly locking these two elements together. When the sleeve is slid upwardly, the handle may then be pivoted relative to the strut member.

To provide for compactness, and low weight, one feature of the invention is the use of the tubular frame member as a muffler. The exhaust port of the engine is coupled to the frame adjacent the rearward end thereof. One or more small diameter openings in the frame permits exhaust flow therefrom and thereby permits the frame to function as a muffler.

The combination of the tubular frame and resilient pads positioned between the platform and the mounting brackets secured to the frame provide a shock-absorbing rider support system.

Another feature of the invention is the unique, compact and simple means of coupling the rotation of the engine to the rear wheel. This is accomplished by means of a hydraulic torque converter employing rotating concentric elements, coupled to each other by a thixotropic hydraulic fluid.

These and other features and advantages of the invention will be described in greater detail in the following description and claims, taken in conjunction with the attached drawings.

DESCRIPTION OF THE VIEWS

FIG. 1 is an elevation view of a motor scooter employing the principles of this invention and showing the handle member in solid outline as in the position wherein the user can ride on the motor scooter. In one dotted outline, the handle is moved forwardly whereby the user may pull the motor scooter behind him. In another dotted outline, the handle member is pivoted rearwardly to extend over and generally parallel the frame of the scooter to permit the user to easily carry the scooter.

DETAILED DESCRIPTION OF THE PREFERRED EMBODIMENT

Figure 1:
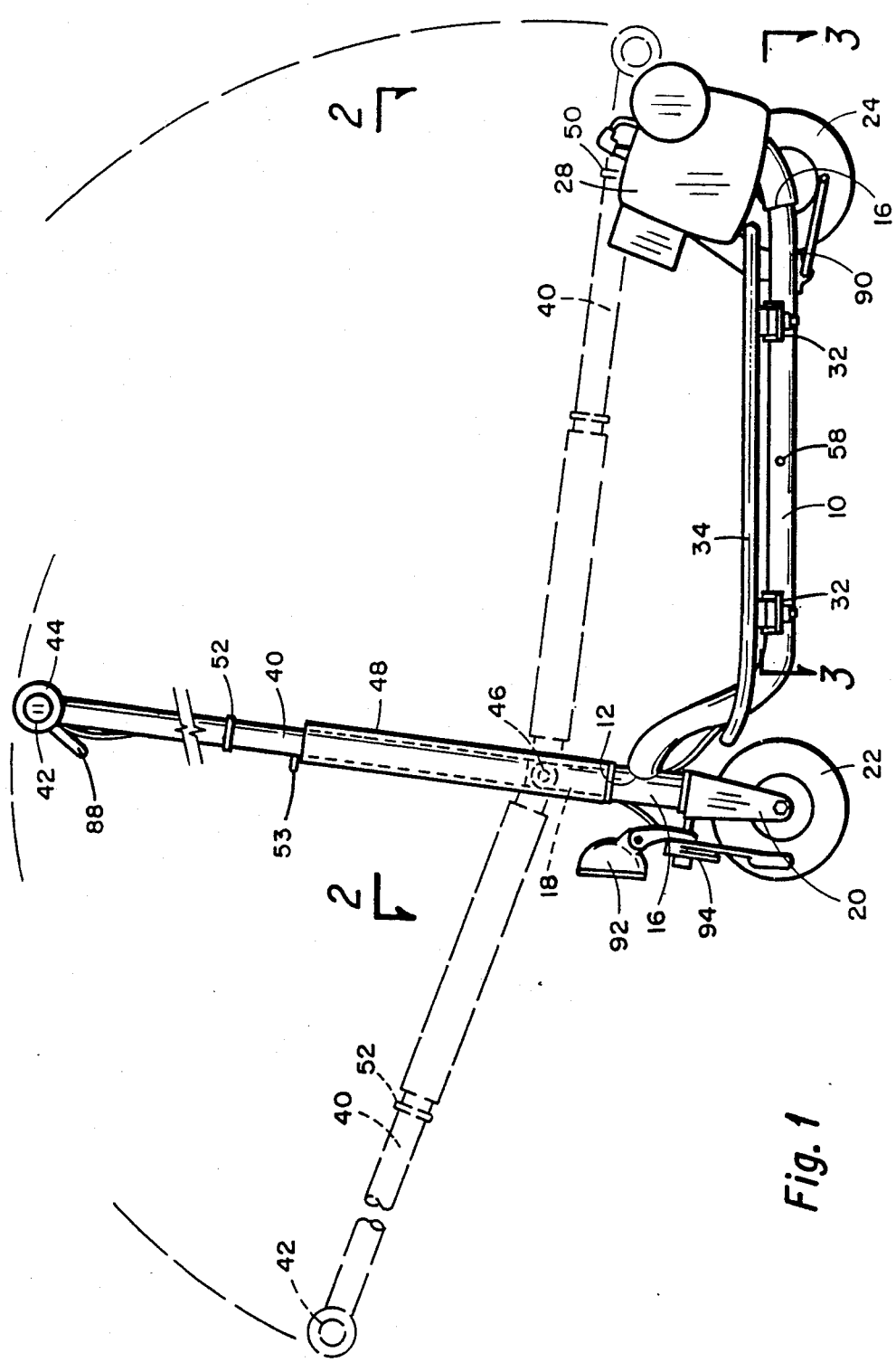

Referring to FIG. 1, a preferred embodiment of the invention is illustrated. The scooter includes an elongated tubular frame 10 having a forward end 12 and a rearward end 16. Secured to the frame forward end 12 is a generally vertical tubular support member 16 which rotatably receives a strut member 18. The lower end of the strut member is in the form of a yoke 20 which rotatably receives a front wheel 22.

A rear drive wheel 24 is supported to the tubular frame 10 adjacent the rearward end 16 thereof, such as by means of a box, the lower end of which is opened, the sides of the box extending down to form a yoke to rotatably receive the drive wheel.

Secured to the frame member 10 adjacent the rearward end 16 thereof is an engine 28, preferably a gasoline engine which can either be 2 cycle or 4 cycle, with a 2 cycle engine being preferred because of its charactistic compactness and high power output per unit of weight. The engine 28 has a drive shaft 30 extending therefrom (see FIG. 5) and the rotational energy output of the engine is coupled to the drive wheel 24. An example of one means of coupling the engine to the drive wheel 24 will be described subsequently.

Figure 2:
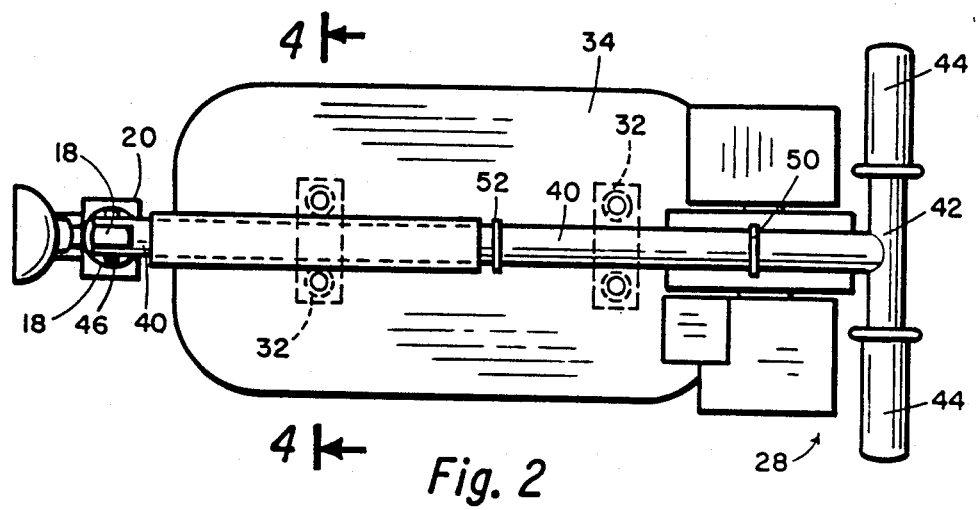
FIG. 2 is a top view of the scooter of FIG. 1 with the handle shown in the rearward or carrying position.
Figure 4:
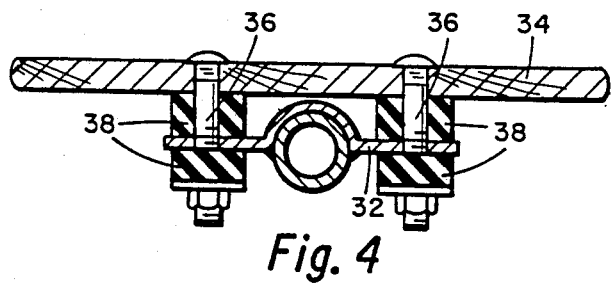
FIG. 4 is a partial cross-sectional view taken the line 4—4 of FIG. 2 showing the method of mounting the platform to the tubular frame member.
Figure 3:
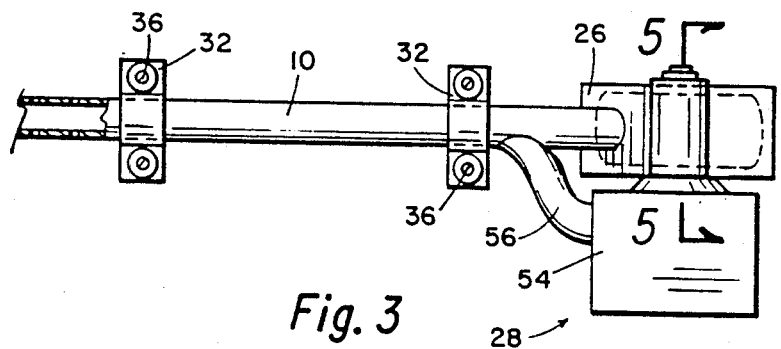
FIG. 3 is a partial cross-sectional view taken the line 3—3 of FIG. 1.

As shown in FIGS. 2, 3 and 4, two mounting brackets 32 are affixed to the frame member. As shown best in FIG. 4 the mounting brackets have integral wing portions. A platform 34 is secured to the mounting brackets 32 by means of bolts 36. Resilient shock absorbing pads 38 are positioned between the brackets 32 and the platform 38. These pads, coupled with the flexibility of the frame member 10 provide a shock absorbing and cushioned ride for the user.

FIGS. 1 and 2 show a unique handle arrangement of the motor scooter. In FIG. 1, in solid outline, a handle member 40, in the form of an elongated tubular member, is shown in upright position as used in operating the motor scooter. At the upper end of the handle is a horizontal handle bar 42 having hand grips 44, such as made of rubber or plastic, on each end thereof. The lower end of the handle member 40 is pivotally attached to the upper end of the strut member 18 by a pivot pin 46. A tubular member 48 is slideably received on the lower end of the handle member and extends telescopically down over the upper end of the strut member 18 when the handle member is in the erect position as shown in solid outline in FIG. 1. When the tubular member 48 is slid upwardly, the handle member can be pivoted forwardly or rearwardly. In the forward position as shown in dotted outline in FIG. 1, the handle bar 42 can be used to pull the scooter. When pivoted rearwardly to extend generally horizontally over the frame member 10, the handle member can be secured by a latch 50 and thereby the handle member serves as a convenient means for carrying the motor scooter.

It can be seen that the tubular member 48 serves as a convenient means of releaseably locking the handle member relative to the strut member 18. A stop 52 limits the upper travel of the tubular member 48. A pop-out button or latch 53 serves to lock tubular member 48 in the down position.

Another unique feature of the motor scooter is the employment of the tubular frame 10 as a muffler. The engine has an exhaust port generally indicated by the numeral 54. An exhaust tube 56 connects the exhaust port 58 with the interior of the tubular frame 10. One or more small diameter openings 58 are provided in the tubular frame 10 and function as exhaust ports. In a typical application the use of two ⅛ inch diameter holes serves as satisfactory exhaust ports for the muffler formed by the tubular frame when a small two cycle engine is employed. In this way the tubular frame 10 serves the dual function of providing the superstructure for the motor scooter as well as serving as the muffler system.

Figure 5:
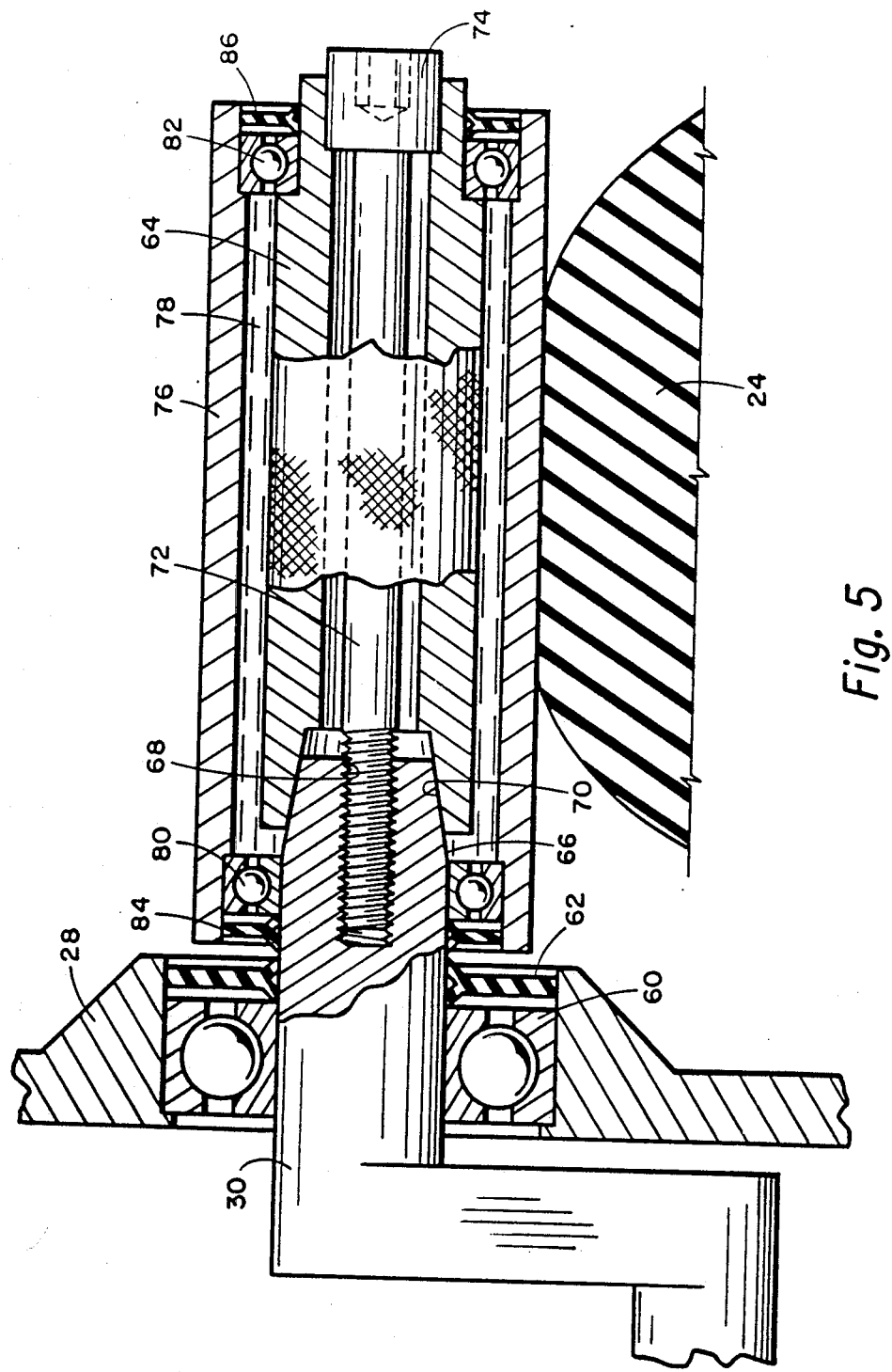

The scooter requires a means to transfer rotational energy from engine 28 to the rear drive wheel 24. FIG. 5 shows one means of accomplishing this purpose. Engine 28 has a drive shaft 30 extending therefrom. A bearing 60 supports the drive shaft in the frame of engine 28 and a seal 62 serve to close the opening in the engine frame provided for bearing 60. Affixed to the outer end of drive shaft 30 is a tubular drive spindle 64. In the arrangement shown the outer end of engine crankshaft 30 is tapered at 66 and has a threaded opening 68 therein. The drive spindle 64 is provided with a mating internal taper 70. A bolt 72 is received in the threading opening 68, the bolt 74 thereby serving to retain the drive spindle 64 in axial alignment with the engine crank shaft.

Received on the drive spindle is a tubular driven spindle 76. The interior diameter of the tubular drive spindle 76 is greater than the exterior of the drive spindle 64 providing an annular area 78 between the two spindles. Bearings 80 and 82 and seals 84 and 86 rotatably support the driven spindle 78 relative to the drive spindle and close the annual area 78. A thixotropic hydraulic fluid fills the annular area 78. The external surface of the drive spindle 64, and internal surface of drive spindle 76 are preferably splined or knurled to achieve desired dynamic hydraulic drag. The viscosity of the thixotropic hydraulic flud, the spacing of the spindles and the total surface area of the spindles can be varied to provide the torque transmittal characteristics required for the scooter. The external surface of spindle 76 is preferably splined or knurled to impose proper friction to drive wheel 24.

The torque converter of FIG. 5 allows the engine to run at idling speeds while imparting insignificant torque to rear drive wheel 24, but as the speed of the engine is increased the torque transmitted increases to provide transfer of power from engine 28 to the rear drive wheel 24 in a smooth transitional manner without requiring the use of other more elaborate transmission techniques.

The motor scooter described herein is unique in its extreme light-weight and portability. The motor scooter can easily be carried in the trunk of a car, in a motor home or as luggage on an air plane. When the user needs transportation, the scooter is readily placed in condition for use by erecting the handle member 40 allowing the tubular member 48 to slide downwardly into the locked position by latch 53. When the motor is started, the user can stand on the platform and be quickly moved about. The usual amenities of a scooter are provided, including throttle control and a brake control 88 on the handle bar. A kick stand 90 is used to hold the scooter in upright position. The scooter can be equipped with lights 92 as required to conform to applicable traffic codes. A front brake caliper brake system 94 is employed in the usual way for stopping the motor scooter.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use on a motor scooter having a frame, a guideable front wheel, a platform on said frame for receiving a user thereon, a rear wheel rotatably supported to the frame and an engine supported to the frame having a drive shaft extending therefrom, the rotary axis of the drive shaft being parallel to and spaced from the rotary axis of the wheel, and the wheel having a resilient tire thereon, a hydraulic torque converter for coupling the rotational energy available from the engine drive shaft to the tire of the wheel, comprising:

an elongated cylindrical drive spindle affixed concentrically to and extending from said engine drive shaft;

a tubular driven spindle having an internal diameter greater than said drive spindle external diameter, the drive spindle being concentrically received within said driven spindle, the driven spindle being positioned in engagement with the tire of a wheel for rotation of the wheel in response to the rotation of the driven spindle;

bearing within each end of said driven spindle rotatably supporting said driven spindle to said drive spindle;

seal means at the ends of said driven spindle forming a closed annular area between the exterior of the drive spindle and the interior of the driven spindle; and hydraulic fluid filling said closed area between the exterior of drive spindle and the interior of said driven spindle.

2. The hydraulic torque converter of claim 1 wherein said hydraulic fluid is thixotropic.

3. An improved light weight motor scooter comprising:

an elongated, generally horizontal, frame member having a forward end and a rearward end;

a rear drive wheel secured to said frame member rearward end and mounted for rotation about an axis normal to the longitudinal vertical plane of said frame member;

a general vertical tubular support member secured to said frame member forward end and in the vertical plane of said frame member;

a generally vertical strut member rotatably received in said tubular support member and having an upper end and a lower end and having a yoke member on the lower end thereof below said tubular support member, the upper end thereof being above said tubular support member;

a front wheel rotatably affixed to said yoke member;

a horizontal platform means received on said frame member between said front and rear wheels;

an engine secured to said frame member adjacent said rearward end thereof, the engine having a drive shaft extending therefrom;

an elongated handle member having a lower end and an upper end, the lower end being affixed to the upper end of said strut member;

an elongated cylindrical drive spindle affixed concentrically to and extending from said engine drive shaft;

a tubular driven spindle having an internal diameter greater than the external diameter of said drive spindle, the drive spindle being concentrically received within said driven spindle, the driven spindle being in engagement with said rear drive wheel for rotation of the drive wheel in response to the rotation of the driven spindle;

bearings within each end of said driven spindle rotatably supporting said driven spindle to said drive spindle;

seal means at the inner ends of said driven spindle closing the ends thereof and forming a closed annular area between the exterior of the drive spindle and the interior of the driven spindle; and hydraulic fluid filling said closed area between said drive spindle and said driven spindle.

4. An improved light weight motor scooter comprising:

an elongated, generally horizontal, frame member having a forward end and a rearward end and having a plane extending longitudinal of the frame member;

a rear drive wheel secured to said frame member rearward end and mounted for rotation about an axis normal to the vertical plane of said frame member;

a general vertical tubular support member secured to said frame member forward end and in the longitudinal plane of said frame member;

a general vertical relatively short strut member rotatably received in said tubular support member and having an upper end and a lower end and having a yoke member on the lower end thereof below said tubular support member, the upper end thereof being above said tubular support member;

a front wheel rotatably affixed to said yoke member;

a generally horizontal platform means received on said frame member between said front and rear wheels;

an engine secured to said frame member adjacent said rearward end thereof, the engine having a drive shaft extending therefrom;

a three position elongated handle member having a lower end and an upper end, the lower end being pivotally affixed to the upper end of said strut member for pivotation in a vertical plane relative to said strut member, the handle member having a horizontal handle bar affixed to the upper end thereof;

means to releaseably lock said handle member to said strut member whereby in the first locked position the handle member is axially aligned with said strut member and in an unlocked position said handle member may be pivoted to a second forward position to permit said motor scooter to be pulled by a user or pivoted rearwardly to a third position overlying said frame member;

means to releaseably retain said handle member in a rearward position overlying said frame member to permit said motor scooter to be carried by said handle member;

an elongated cylindrical drive spindle affixed concentrically to and extending from said engine drive shaft;

a tubular driven spindle having an internal diameter greater than the external diameter of said drive spindle, the drive spindle being concentrically received within said driven spindle;

bearings within each end of said driven spindle rotatably supporting said driven spindle to said drive spindle;

seal means at the inner ends of said driven spindle closing the ends thereof and forming a closed annular area between the exterior of the drive spindle and the interior of the driven spindle; and hydraulic fluid filling said closed area between said drive spindle and said driven spindle.

* * * * *